United States Patent [19]

Ueyama

[11] E Patent Number: Re. 32,999

[45] Reissued Date of Patent: Jul. 25, 1989

[54] HEAT-SENSITIVE TRANSFERRING RECORDING MEDIUM

[75] Inventor: Seiji Ueyama, Hirakata, Japan

[73] Assignee: General Company Limited, Osaka, Japan

[21] Appl. No.: 124,569

[22] Filed: Nov. 24, 1987

Related U.S. Patent Documents

Reissue of:

[64] Patent No.: 4,698,268
Issued: Oct. 6, 1987
Appl. No.: 759,853
Filed: Jul. 29, 1985

[30] Foreign Application Priority Data

Jul. 1, 1985 [JP] Japan ..... 60-144205

[51] Int. Cl.[4] ..... B41M 5/26

[52] U.S. Cl. ..... 428/484; 428/195; 428/483; 428/488.1; 428/488.4; 428/497; 428/521; 428/522; 428/913; 428/914

[58] Field of Search ..... 428/195, 483, 484, 488.1, 428/488.4, 497, 521, 522, 913, 914

[56] References Cited

U.S. PATENT DOCUMENTS

| | | | |
|---|---|---|---|
| 2,777,781 | 1/1957 | Kordig et al. | 428/488.4 |
| 3,944,695 | 3/1976 | Kosaka et al. | 428/488.1 |
| 4,505,983 | 3/1985 | Kuroda et al. | 428/488.1 |
| 4,559,273 | 12/1985 | Kutsukake et al. | 428/488.4 |

FOREIGN PATENT DOCUMENTS

| | | | |
|---|---|---|---|
| 0154438 | 9/1985 | European Pat. Off. | 428/488.4 |
| 0048188 | 3/1984 | Japan | 428/914 |

*Primary Examiner*—Ellis P. Robinson
*Assistant Examiner*—P. R. Schwartz
*Attorney, Agent, or Firm*—Wegner & Bretschneider

[57] ABSTRACT

A heat-sensitive transferring recording medium comprises a heat resistant substrate and a heat-sensitive transferring ink layer overlying the heat sensitive substrate, the heat-sensitive transferring ink essentially consisting of (1) a wax of penetration (JIS K 2235) of not higher than 25 (at 25° C.), (2) a resin component composed of both ethylene-vinyl acetate copolymer and aromatic modified terpene resin, and (3) a coloring agent, and the content of the resin component being 10–30% by weight based on the solid matter in the heat-sensitive transferring ink. An overcoat layer may be formed on the heat-sensitive transferring ink layer.

4 Claims, No Drawings

HEAT-SENSITIVE TRANSFERRING RECORDING MEDIUM

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to a heat-sensitive transferring recording medium, and more particularly, to a heat-sensitive transferring recording medium useful for heat-sensitive transferring recording apparatuses such as thermal facsimile, thermal printers and the like.

2. Description of the Prior Art

Heat-sensitive transferring systems free from noise upon printing, and the printed images are clear, of high quality and excellent in storing durability. In view of such many advantages, heat-sensitive transferring systems have been recently developed to a great extent and are used for printers, facsimile and the like.

The heat-sensitive transferring recording mediums are composed of a paper such as glassine paper, condenser paper and the like or a film such as polyimide film, PET (polyethylene terephthalate) film and the like, and an ink such as an ink composed of wax and coloring agent, an ink composed of resin and coloring agent, an ink composed of wax, resin and coloring agent, and the like, coated on the paper or film.

However, an ink mainly composed of wax exhibits good recording sensitivity, but smudge occurs.

On the contrary, an ink mainly composed of resin does not cause smudge, but is low at recording sensitivity.

Further, an ink mainly composed of both wax and resin exhibits the characteristics of the wax ink when the content of wax component is more than that of resin component, but exhibits the characteristics of the resin ink when the content of resin component is more than that of wax component. There have been investigated various kinds of inks giving sharp printed images and no smudge within the range of the above-mentioned inks. However, there have been not yet obtained any satisfactory heat-sensitive transferring recording mediums.

SUMMARY OF THE INVENTION

An object of the present invention is to provide a heat-sensitive transferring recording medium free from smudge and giving clear printed images.

Another object of the present invention is to provide a heat-sensitive transferring recording medium of improved transferring efficiency, free from void, of high density of printed image, and capable of producing improved clear printed images.

According to the present invention, there is provided a heat-sensitive transferring recording medium which comprises a heat resistant substrate and a heat-sensitive transferring ink layer overlying the heat resistant substrate, the heat-sensitive transferring ink essentially consisting of (1) a wax of penetration (JIS K 2235) of not higher than 25 (at 25° C.), (2) a resin component composed of both ethylene-vinyl acetate copolymer and aromatic modified perpene resin, and (3) a coloring agent, and the content of the resin component being 10–30% by weight based on the solid matter in the heat-sensitive transferring ink. An overcoat layer may be formed on the heat-sensitive transferring ink layer.

DESCRIPTION OF THE PREFERRED EMBODIMENTS

When the penetration (JIS K 2235) of a wax is higher than 25, smudge occurs.

Even when the penetration of a wax is within the range of the present invention, there occurs smudge and/or clear printed images are not obtained if a resin component other than that of the present invention is used.

Even when the penetration of the wax component is that defined in the present invention, there occurs smudge, and/or clear printed images are not obtained if the content of the resin component is not within the specified range of the present invention.

Waxes used in the present invention include those usually used for heat-sensitive transferring recording mediums such as carnauba wax, montan wax, oxidized wax, paraffin wax, microcrystalline wax, low molecular weight polyethylene wax, and the like as far as they satisfy the condition of the present invention.

The resin component is composed of both ethylene-vinyl acetate copolymer and aromatic modified terpene resin. On the contrary, ionomer resins, low molecular weight polyethylene, poly(vinyl stearate) and the like which can be usually used for heat-sensitive transferring recording mediums are not useful in the present invention.

Examples of the aromatic modified terpene resin are YS Polyster T and YS Resin TO (tradenames, manufactured by Yasuhara Yushi Co., Ltd., Japan).

As the coloring agent, there may be mentioned coloring agents usually used for heat-sensitive transferring recording mediums such as carbon black, Ultramarine, lake red and the like.

As additives to the ink, there may be used a softening agent, for example, various oils such as animal oils, vegetable oils, mineral oils and the like.

As the substrate, there may be used a paper base substrate such as condenser paper, glassine paper and the like, and a plastic film such as polyimide film, polyester film; PET film and the like.

Where the substrate has a heat resistant protective layer, the heat resistant protective layer may be a thin film of fatty acid amides, fluorocarbon polymers, silicone resins and the like.

As the overcoat layer, there may be used resins, waxes or mixtures thereof. Thickness of the overcoat layer is usually 1–10$\mu$, preferably 1–5$\mu$. The resins include low molecular weight polyethylene, poly(vinyl stearate), polystyrene, styrene-butadiene copolymer, ethylene-vinyl acetate copolymer and the like, and the waxes include carnauba wax, ouricury wax microcrystalline wax, paraffin wax and the like.

If desired, there may be added to the overcoat layer some additives, for example, a lubricant such as talc, metal salts of fatty acids, fatty acid amides and the like.

EXAMPLE 1

To the surface of a PET film of 3$\mu$ thick was applied a silicone oil dissolved in toluene by a solvent coating method to form a heat resistant protective layer of 3 g/m$^2$.

To the surface opposite to the heat resistant protective layer of the PET film was applied an ink as shown in the following table (the component amount being by weight) by a hot melt coating method to form a heat-sensitive transferring ink layer of 5 g/m$^2$. Printing test was effected by using a printing machine TN 5000 (tradename, manufactured by Toshiba K.K.).

| Sample No. | | 1 | 2 | 3 | 4 | 5 | 6 | 7 |
|---|---|---|---|---|---|---|---|---|
| Material | Ethylene-vinyl acetate copolymer | 8 | 5 | 5 | 15 | | | 8 |
| | Aromatic modified terpene resin | 8 | 10 | 5 | 15 | | | 8 |
| | Ionomer resin | | | | | 16 | | |
| | Low molecular weight polyethylene | | | | | | 15 | |
| | Carnauba | 20 | 10 | 15 | 10 | 20 | 10 | |
| | Oxidized wax | 30 | | 20 | 20 | 30 | | |
| | Paraffin wax | 10 | 55 | 30 | 15 | 10 | 55 | |
| | Microcrystalline wax | 10 | 5 | 10 | 10 | 10 | 15 | |
| | Japan wax (Penetration 30 at 25° C.) | | | | | | | 70 |
| | Softening agent | 5 | | 5 | 5 | 5 | | 5 |
| | Coloring agent | 9 | 5 | 10 | 10 | 9 | 5 | 9 |
| Evaluation | Density | O | O | O | O | O | O | O |
| | Clearness of printed image | O | O | O | O | Δ | Δ | Δ |
| | Smudge | O | O | O | O | Δ | Δ | Δ |
| | Overall evaluation | O | O | O | O | Δ | Δ | Δ |

O : Good
Δ: Practically not usable

EXAMPLE 2

To the heat-sensitive transferring ink layer of Sample No. 1 of Example 1 was applied a melted mixture of 50% by weight of carnauba and 50% by weight of paraffin wax to form an overcoat layer of 2μ thick. The resulting heat-sensitive transferring recording medium gave a better transferring efficiency, far less voids, and higher density of printed images than Sample No. 1 in Example 1.

The present invention provides a heat-sensitive transferring recording medium giving no smudge and clear printed images. Where the overcoat is provided, in addition to the above advantages, the transferring efficiency is good, voids are decreased, and density of the printed images is high.

What is claimed is:

1. A heat-sensitive transferring recording medium which comprises a heat resistant substrate and a heat-sensitive transferring ink layer overlying the heat resistant substrate, the heat-sensitive transferring ink consisting essentially of (1) a wax of penetration (JIS K 2235) of not higher than 25 (at 25° C.), (2) a resin component composed of both ethylene-vinyl acetate copolymer and aromatic modified terpene resin, and (3) a coloring agent, and the content of the resin component being 10–30% by weight based on the solid matter in the heat-sensitive transferring ink.

2. A heat-sensitive transferring recording medium according to claim 1 in which the heat resistant substrate is a plastic film provided with a heat resistant protective layer, and the heat-sensitive transferring ink layer is formed on a surface of the plastic film opposite to the surface having the heat resistant protective layer.

3. A heat-sensitive transferring recording medium which comprises a heat resistant substrate, a heat-sensitive transferring ink layer overlying the heat resistant substrate, and an overcoat layer formed on said ink layer, the heat-sensitive transferring ink consisting essentially of (1) a wax of penetration (JIS K 2235) of not higher than 25 (at 25° C.), (2) a resin component composed of both ethylene-vinyl acetate copolymer and aromatic modified terpene resin, and (3) a coloring agent, and the content of the resin component being 10–30% by weight based on the solid matter in the heat-sensitive transferring ink.

4. A heat-sensitive transferring recording medium according to claim 3 in which the heat resistant substrate is a plastic film provided with a heat resistant protective layer, and the heat-sensitive transferring ink layer is formed on a surface of the plastic film opposite to the surface having the heat resistant protective layer.

* * * * *